United States Patent
Morishima et al.

(10) Patent No.: US 10,066,557 B2
(45) Date of Patent: Sep. 4, 2018

(54) CONTROL DEVICE FOR INTERNAL COMBUSTION ENGINE

(71) Applicant: TOYOTA JIDOSHA KABUSHIKI KAISHA, Toyota-shi, Aichi-ken (JP)

(72) Inventors: Akinori Morishima, Kanagawa-ken (JP); Taku Ibuki, Susono (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/804,450

(22) Filed: Nov. 6, 2017

(65) Prior Publication Data
US 2018/0149098 A1 May 31, 2018

(30) Foreign Application Priority Data
Nov. 25, 2016 (JP) .................. 2016-229289

(51) Int. Cl.
| | |
|---|---|
| *F02M 26/25* | (2016.01) |
| *F02D 41/00* | (2006.01) |
| *F02M 26/53* | (2016.01) |
| *F02M 26/26* | (2016.01) |
| *F02M 26/50* | (2016.01) |
| *F02M 26/00* | (2016.01) |

(52) U.S. Cl.
CPC ..... *F02D 41/0052* (2013.01); *F02D 41/0077* (2013.01); *F02M 26/25* (2016.02); *F02M 26/26* (2016.02); *F02M 26/50* (2016.02); *F02M 26/53* (2016.02); *F02M 2026/004* (2016.02)

(58) Field of Classification Search
CPC .... F02D 41/0077; F02M 26/25; F02M 26/26; F02M 26/50; F02M 2026/004
USPC .................................................... 123/568.12
See application file for complete search history.

(56) References Cited

U.S. PATENT DOCUMENTS

| | | | |
|---|---|---|---|
| 7,207,324 B2* | 4/2007 | Kuhnel ................. | F02B 31/085 123/184.43 |
| 2004/0060549 A1* | 4/2004 | Kobayashi ............. | F02M 26/32 123/568.21 |
| 2006/0112679 A1 | 6/2006 | Kojima et al. | |

(Continued)

FOREIGN PATENT DOCUMENTS

| | | |
|---|---|---|
| DE | 102010003798 A1 | 10/2011 |
| DE | 102015202904 A1 | 8/2016 |

(Continued)

*Primary Examiner* — Erick Solis
(74) *Attorney, Agent, or Firm* — Sughrue Mion, PLLC

(57) ABSTRACT

A control device for an internal combustion engine adjusts the flow rate ratio between an amount of exhaust gas flowing to an exhaust gas recirculation cooler and an amount of exhaust gas flowing to a bypass passage, which bypasses the exhaust gas recirculation cooler, such that the amount of exhaust gas flowing to the exhaust gas recirculation cooler becomes zero during (i) a predetermined period from a point in time at which the exhaust gas recirculation operation shifts to execution, (ii) a period in which fuel cut is performed and the bed temperature of a catalyst is lower than a predetermined overheat temperature, or (iii) a period in which the flow rate of refrigerant flowing to the exhaust gas recirculation cooler is lower than a predetermined flow rate and the temperature of the refrigerant is lower than a predetermined first temperature.

7 Claims, 5 Drawing Sheets

(56) References Cited

U.S. PATENT DOCUMENTS

| | | | |
|---|---|---|---|
| 2012/0046854 A1 | 2/2012 | Sangkyu et al. | |
| 2014/0283798 A1 | 9/2014 | Shimane | |
| 2014/0352663 A1* | 12/2014 | Glugla | F02D 41/0085 123/443 |
| 2015/0027421 A1* | 1/2015 | Yamashita | F02D 41/123 123/568.21 |
| 2015/0128587 A1* | 5/2015 | Dane | F02M 45/02 60/605.2 |

FOREIGN PATENT DOCUMENTS

| | | |
|---|---|---|
| DE | 102015220039 A1 | 8/2016 |
| EP | 2418370 A2 | 2/2012 |
| FR | 2887592 A1 | 12/2006 |
| GB | 2509737 A | 7/2014 |
| JP | 2014-181607 A | 9/2014 |
| JP | 2015-068274 A | 4/2015 |
| JP | 2016-075169 A | 5/2016 |

* cited by examiner

CONTROL DEVICE FOR INTERNAL COMBUSTION ENGINE

INCORPORATION BY REFERENCE

The disclosure of Japanese Patent Application No. 2016-229289 filed on Nov. 25, 2016 including the specification, drawings and abstract is incorporated herein by reference in its entirety.

BACKGROUND

1. Technical Field

The present disclosure relates to a control device for an internal combustion engine, and more particularly, a control device for an internal combustion engine that performs an exhaust gas recirculation (EGR) operation for recirculating a part of gas exhausted from the internal combustion engine into an intake system.

2. Description of Related Art

As a related art, for example, Japanese Unexamined Patent Application Publication No. 2016-075169 (JP 2016-075169 A) discloses an EGR apparatus configured to bypass an EGR cooler by selectively flowing the recirculation gas to the bypass passage using a flow path switching valve. The apparatus adopts a swing type flow path switching valve capable of closing the entrance of each of the EGR cooler and the bypass passage by individual fitting and clamping to a valve seat provided at each entrance. According to the configuration of the flow path switching valve, the exhaust gas is prevented from entering the EGR cooler through a small gap when the EGR valve is fully closed.

SUMMARY

When the recirculated exhaust gas (EGR gas) is cooled below the dew point in the EGR passage, condensed water is generated to cause corrosion. In the related art, the EGR gas can be prevented from entering the EGR cooler when the EGR valve is closed. However, for the entry of the EGR gas to the EGR cooler when the EGR valve is open, no consideration has been made from the viewpoint of preventing the generation of condensed water. Therefore, in the related art, in a wide operating state, there is still room for improvement in suppressing the generation of condensed water in the EGR passage.

The disclosure provides a control device for an internal combustion engine capable of suppressing the generation of condensed water in an EGR passage.

An aspect relates to a control device for an internal combustion engine. The control device includes: an exhaust gas recirculation passage (EGR passage) that connects an exhaust passage and an intake passage of an internal combustion engine to each other, an exhaust gas recirculation cooler (EGR cooler) disposed in the exhaust gas recirculation passage, the exhaust gas recirculation cooler being configured to perform heat exchange between refrigerant and exhaust gas which flow through the exhaust gas recirculation cooler, a bypass passage which is divided form from the exhaust gas recirculation passage, the bypass passage being configured to bypass the exhaust gas recirculation cooler, a flow rate ratio adjusting mechanism configured to adjust a flow rate ratio between an amount of exhaust gas flowing to the exhaust gas recirculation cooler and an amount of exhaust gas flowing to the bypass passage, an exhaust gas recirculation control mechanism (EGR control mechanism) configured to control execution and stopping of an exhaust gas recirculation operation (EGR operation) for recirculating exhaust gas into a cylinder of the internal combustion engine through the exhaust gas recirculation passage, and an electronic control unit configured to control the exhaust gas recirculation control mechanism and the flow rate ratio adjusting mechanism based on an operating state of the internal combustion engine. The electronic control unit is configured to adjust the flow rate ratio such that the amount of exhaust gas flowing to the exhaust gas recirculation cooler becomes zero during (i) a predetermined period from a point in time at which the exhaust gas recirculation operation shifts from stop to execution, (ii) a period in which fuel cut, in which fuel injection is stopped, is performed and a bed temperature of a catalyst disposed in the exhaust passage is lower than a predetermined overheat temperature, or (iii) a period in which a flow rate of refrigerant flowing to the exhaust gas recirculation cooler is lower than a predetermined flow rate and a temperature of the refrigerant is lower than a predetermined first temperature.

In the control device according to the aspect, the electronic control unit may be configured to adjust the flow rate ratio such that the amount of exhaust gas flowing to the bypass passage becomes zero when the bed temperature of the catalyst reaches the overheat temperature during a period in which the fuel cut is performed.

In the control device according to the aspect, the electronic control unit may be configured to adjust the flow rate ratio such that the amount of exhaust gas flowing to the exhaust gas recirculation cooler becomes zero during a period in which the temperature of the refrigerant is lower than a predetermined second temperature after the exhaust gas recirculation operation shifts from stop to execution.

In the control device according to the aspect, the flow rate ratio adjusting mechanism may be a flow rate ratio adjusting valve that is provided at an upstream side connecting portion at which the exhaust gas recirculation passage and the bypass passage are connected, and the upstream side connecting portion is closer to the exhaust passage than the exhaust gas recirculation cooler in the exhaust gas recirculation passage. The exhaust gas recirculation control mechanism may be an exhaust gas recirculation control valve that is provided to be closer to the intake passage than the exhaust gas recirculation cooler in the exhaust gas recirculation passage, the exhaust gas recirculation control valve is closer to the intake passage than a downstream side connecting portion at which the exhaust gas recirculation passage and the bypass passage are connected, and the downstream side connecting portion is closer to the intake passage than the exhaust gas recirculation passage.

In the control device according to the aspect, the flow rate ratio adjusting mechanism may be a flow rate ratio adjusting valve that is provided at a downstream side connecting portion at which the exhaust gas recirculation passage and the bypass passage are connected, and the upstream side connecting portion is closer to the intake passage than the exhaust gas recirculation cooler in the exhaust gas recirculation passage. The exhaust gas recirculation control mechanism may be an exhaust gas recirculation control valve that is provided so as to be closer to the intake passage than the flow rate ratio adjusting valve in the exhaust gas recirculation passage.

In the control device according to the aspect, the flow rate ratio adjusting mechanism may include a first flow rate adjusting valve and a second flow rate adjusting valve. The first flow rate adjusting valve is provided so as to be closer to the exhaust passage than the exhaust gas recirculation cooler in the exhaust gas recirculation passage, the first flow rate adjusting valve is closer to the intake passage than an upstream side connecting portion at which the exhaust gas recirculation passage and the bypass passage are connected. The second flow rate adjusting valve is provided in the bypass passage, and the exhaust gas recirculation control mechanism includes the first flow rate adjusting valve and the second flow rate adjusting valve.

In the control device according to the aspect, the flow rate ratio adjusting mechanism is configured to include a first flow rate adjusting valve and a second flow rate adjusting valve, the first flow rate adjusting valve is provided in the exhaust gas recirculation passage and the first flow rate adjusting valve is closer to the intake passage than a downstream side connecting portion at which the exhaust gas recirculation passage and the bypass passage are connected, and a second flow rate adjusting valve is provided in the bypass passage, and the exhaust gas recirculation control mechanism is configured to include the first flow rate adjusting valve and the second flow rate adjusting valve.

Since the EGR gas does not flow in the EGR passage and the EGR cooler during the period in which the EGR operation is stopped, the temperatures of the EGR passage and the EGR cooler drop. Therefore, when the EGR operation is resumed when a flow rate ratio is adjusted such that the EGR gas flows to the EGR cooler, the temperature of the EGR gas may drop below the dew point in the course of subsequent flowing of the EGR gas through the EGR passage due to a drop in the temperature of the EGR gas by the EGR cooler. In addition, since the temperature of the EGR gas is low during the period in which the fuel cut is performed, the temperature of the EGR cooler drops when the EGR gas flows into the EGR cooler. In a case where the flow rate of the refrigerant introduced into the EGR cooler is lower than the predetermined flow rate and the temperature of the refrigerant is lower than the predetermined temperature, the EGR gas may be cooled in the course of flowing through the EGR passage and the temperature of the EGR gas may drop below the dew point. When the EGR gas continues to flow to the EGR cooler, the refrigerant in the EGR cooler may boil. According to the aspect, in the case of the conditions described above, the flow rate ratio is adjusted such that the amount of gas flowing to the EGR cooler becomes zero. As a result, generation of condensed water in the EGR cooler and the EGR passage can be prevented.

According to the aspect, in a case where the bed temperature of the catalyst is higher than the predetermined overheat temperature during a period in which the fuel cut is performed, the flow rate ratio is adjusted such that the amount of gas flowing to the bypass passage becomes zero. When the EGR gas flows to the EGR cooler during the fuel cut, the temperature of the gas flowing to the catalyst drops due to heat absorption by the EGR cooler. Therefore, since the bed temperature of the catalyst can be lowered, deterioration in the performance of the catalyst can be suppressed.

According to the aspect, after the EGR operation is resumed, the flow rate ratio is adjusted such that the amount of gas flowing to the EGR cooler becomes zero during the period in which the temperature of the refrigerant is lower than the second temperature. As a result, generation of condensed water due to the EGR gas being cooled by the EGR cooler during the EGR operation can be suppressed.

According to the aspect, the flow rate ratio adjusting valve is provided so as to be closer to the exhaust passage than the EGR cooler. Therefore, according to the aspect, when the flow rate ratio is adjusted such that the amount of gas flowing to the EGR cooler becomes zero, the flow of the exhaust gas into the EGR cooler due to pulsation can be prevented. In addition, since the flow rate ratio and the EGR ratio are adjusted by different valves, adjustment of the flow rate ratio and the EGR ratio becomes easy.

According to the aspect, since the flow rate ratio and the EGR ratio are adjusted by different valves, adjustment of the flow rate ratio and the EGR ratio is easy.

According to the aspect, the first flow rate adjusting valve is provided so as to be closer to the exhaust passage than the EGR cooler. According to such a configuration, when the flow rate ratio is adjusted such that the amount of gas flowing to the EGR cooler becomes zero, the flow of the exhaust gas into the EGR cooler due to pulsation can be prevented.

According to the aspect, the first flow rate adjusting valve is provided so as to be closer to the intake passage than the EGR cooler. According to such a configuration, the second flow rate adjusting valve can be prevented from being overheated by the high-temperature EGR gas.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Figure 1:
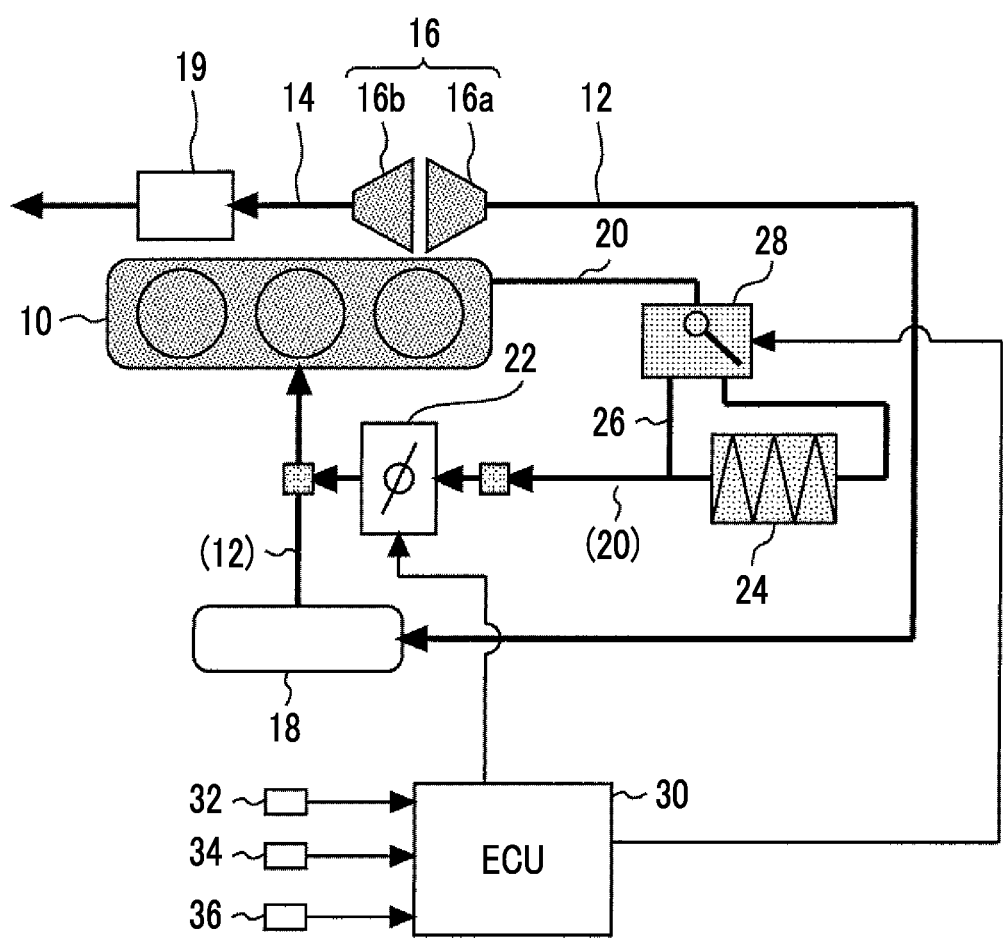
FIG. 1 is a diagram showing the configuration of an engine system to which a control device of an embodiment is applied.

Hereinafter, embodiments will be described with reference to the accompanying diagrams. In the case of referring to the number of elements, the quantity, the range, and the like in the following embodiments, the disclosure is not limited thereto unless otherwise stated or unless the number is clearly specified in principle. Structures, steps, and the like described in the embodiments described below are not necessarily indispensable to the disclosure unless otherwise specified or clearly specified in principle. Common elements in respective diagrams are denoted by the same reference numerals, and repeated description thereof will be omitted.

First Embodiment

A first embodiment will be described with reference to the diagrams.

System Configuration of First Embodiment

FIG. 1 is a diagram showing the configuration of an engine system to which a control device of the embodiment is applied. As shown in FIG. 1, the system of the present embodiment includes an internal combustion engine 10. The internal combustion engine 10 is configured as an in-line three-cylinder diesel engine mounted in a moving body, such as a vehicle. However, the type of the internal combustion engine 10, the number of cylinders, and the arrangement of cylinders are not limited to this. An intake passage 12 and an exhaust passage 14 communicate with each cylinder of the internal combustion engine 10.

A compressor 16a of a supercharger 16 is provided in the intake passage 12. The compressor 16a is driven by the rotation of a turbine 16b disposed in the exhaust passage 14. A water-cooled type intercooler 18 is disposed in the intake passage 12 downstream of the compressor 16a. The intake passage 12 downstream of the intercooler 18 is connected to an intake manifold (not shown) of the internal combustion engine 10. A catalyst 19 for controlling the exhaust gas is provided in the exhaust passage 14 downstream of the turbine 16b. A temperature sensor 32 for detecting the bed temperature of the catalyst 19 is provided for the catalyst 19.

The system of the present embodiment includes an EGR passage 20 that connects an exhaust manifold (not shown) configured as a part of the exhaust passage 14 and the intake passage 12 downstream of the intercooler 18 to each other. An EGR control valve 22 is provided in the EGR passage 20. The EGR control valve 22 functions as an EGR control mechanism that adjusts an EGR ratio that is the ratio of the EGR gas, which is recirculated into the cylinder of the internal combustion engine 10 through the EGR passage 20, to the entire air entering the cylinder. Here, an EGR control valve may be used as an EGR control mechanism. On the exhaust passage side of the EGR control valve 22 in the EGR passage 20, a water-cooled type EGR cooler 24 for heat exchange between the incoming refrigerant and the gas is provided. A bypass passage 26 bypassing the EGR cooler 24 is provided in the EGR passage 20. Hereinafter, among connecting portions between the EGR passage 20 and the bypass passage 26, a connecting portion closer to the exhaust passage than the EGR cooler 24 is referred to as a branch portion, and a connecting portion closer to the intake passage than the EGR cooler 24 is referred to as a junction portion. A flow rate ratio adjusting valve 28 for adjusting the flow rate ratio between the exhaust gas (EGR gas) flowing through the EGR cooler 24 and the exhaust gas (EGR gas) flowing through the bypass passage 26 is provided in the branch portion of the EGR passage 20. Here, a flow rate ratio adjusting valve may be used as a flow rate ratio adjusting mechanism.

The system of the present embodiment includes a refrigerant circuit (not shown) for introducing coolant discharged from a water jacket provided inside the main body of the internal combustion engine 10, as a refrigerant, into the EGR cooler 24. In the refrigerant circuit, the EGR cooler 24, a thermostat (not shown), an electric water pump (not shown), and the like are disposed in the middle thereof. According to such a configuration, since the water pump is driven, the coolant discharged from the main body of the internal combustion engine 10 is introduced into the EGR cooler 24. A temperature sensor 34 for detecting the temperature of the coolant and a flow rate sensor 36 for detecting the flow rate of the coolant are provided in an outlet portion of the water jacket in the main body of the internal combustion engine 10.

The system of the present embodiment includes an electronic control unit (ECU) 30. The ECU 30 is a control device that performs overall control of the engine system. The control device is embodied as one function of the ECU 30. The ECU 30 includes at least an input/output interface, a memory, and a CPU. The input/output interface is provided to receive sensor signals from various sensors attached to the internal combustion engine 10 and the moving body, and to output an operation signal to an actuator provided in the internal combustion engine 10. As a sensor from which a signal is received by the ECU 30, the temperature sensor 32 that detects the temperature of the intake air flowing through a side downstream of a connecting portion connected to the EGR passage 20 in the intake passage 12, that is, the temperature of the intake air suctioned into the cylinder of the internal combustion engine 10, is included. As an actuator to which the ECU 30 outputs an operation signal, the EGR control valve 22 or the flow rate ratio adjusting valve 28 described above is included. Various control programs for controlling the internal combustion engine 10, maps, and the like are stored in the memory. The CPU reads a control program or the like from the memory and executes the control program or the like, and generates an operation signal based on the acquired sensor signal. Although there are many actuators or sensors connected to the ECU 30 other than those shown in the diagram, description thereof will be omitted in this specification.

Operation of First Embodiment (1) EGR Control

Engine control performed by the ECU 30 includes EGR control. In the EGR control of the present embodiment, an opening degree instruction value with respect to the EGR control valve 22 is determined by feedback control or the like so that a state quantity, such as an EGR ratio or an EGR gas amount correlated with the EGR ratio, becomes a target value determined from the operating states, such as the engine speed and the injection amount. In the following description, EGR control in which the target EGR ratio is 0%, that is, a state in which the opening degree instruction value with respect to the EGR control valve 22 indicates a full closure and accordingly the EGR operation is stopped, is referred to as "EGR cut".

(2) Water Stop Control

Engine control performed by the ECU 30 includes water stop control. The water stop control is a control to stop the circulation of coolant for the purpose of warming-up at the cold start of the internal combustion engine 10. In the water stop control of the present embodiment, driving of the water pump is stopped until the temperature of the coolant detected by the temperature sensor 34 reaches a predetermined first temperature. The first temperature is a temperature for determining that the warming-up of the internal combustion engine 10 has proceeded. As the first temperature, a temperature (for example, 60° C.) set in advance is used. Therefore, during the water stop control, the discharge of the coolant from the main body of the internal combustion engine 10 is stopped, and the flow of the coolant to the EGR cooler 24 is also stopped. According to the water stop control, the time needed for warming up the internal combustion engine 10 can be shortened. This improves fuel efficiency. The water stop control is not limited to the control to completely stop the driving of the water pump during the water stop period. That is, the water stop control may include a control to intermittently drive the water pump during the water stop period to prevent local boiling of the coolant.

(3) Intake Air Temperature Control

Engine control performed by the ECU 30 includes intake air temperature control. In the intake air temperature control of the present embodiment, in a case where the EGR gas is recirculated into the cylinder, the temperature of the intake air suctioned into the cylinder is controlled to become closer to a target intake air temperature determined from the operating conditions, such as the engine speed and the injection amount, by adjusting the temperature of the EGR gas introduced into the intake passage 12.

The EGR passage passing through the EGR cooler 24 has higher cooling efficiency than the EGR passage passing through the bypass passage 26. Therefore, the flow rate ratio adjusting valve 28 is used to adjust the intake air temperature. In the intake air temperature control of the present embodiment, the flow rate ratio of the EGR gas passing through the EGR cooler 24 to the total amount of EGR gas is defined as an EGR/C ratio, and the EGR/C ratio needed for the intake air temperature to become closer to the target intake air temperature is calculated. For example, when the EGR/C ratio is set to zero, the amount of gas flowing to the EGR cooler 24 is zero. Accordingly, the total amount of EGR gas flows to the bypass passage 26. On the other hand, when the EGR/C ratio is set to one, the amount of gas flowing to the bypass passage 26 is zero. Accordingly, the total amount of EGR gas flows to the EGR cooler 24. The EGR/C ratio is defined in advance by a map or the like so as to be associated with the operating region, such as the engine speed and the injection amount. In the intake air temperature control of the present embodiment, the EGR/C ratio for the intake air temperature to become closer to the target intake air temperature determined from the operating region is specified from a map. In the intake air temperature control of the present embodiment, the EGR/C ratio may be corrected by feedback control so that the actual intake air temperature becomes closer to the target intake air temperature.

(4) Characteristic Operation of Present Embodiment

Here, it is known that moisture of the exhaust gas is condensed to generate condensed water when the temperature of the exhaust gas drops below the dew point. Therefore, during the period in which the temperatures of components forming the EGR passage, such as the EGR passage 20, the EGR cooler 24, and the EGR control valve, are equal to or lower than the dew point (for example, 56° C. to 60° C.) of the EGR gas, the EGR gas in contact with the components may be cooled below the dew point to generate condensed water. Even if the EGR control valve 22 is closed, this can be caused by constant gas exchange in the EGR passage 20 due to pulsation of the exhaust.

Therefore, the system of the present embodiment has a feature in control to adjust the flow rate ratio adjusting valve 28 so that the EGR/C ratio R becomes zero in the following three conditions in which condensed water is generated in the EGR passage. Hereinafter, the following conditions will be described in more detail: (a) Period in Which Water Stop Control Is Performed; (b) Period in Which Fuel Cut Is Performed; and (c) Period Immediately After Returning from EGR Cut.

Figure 2:
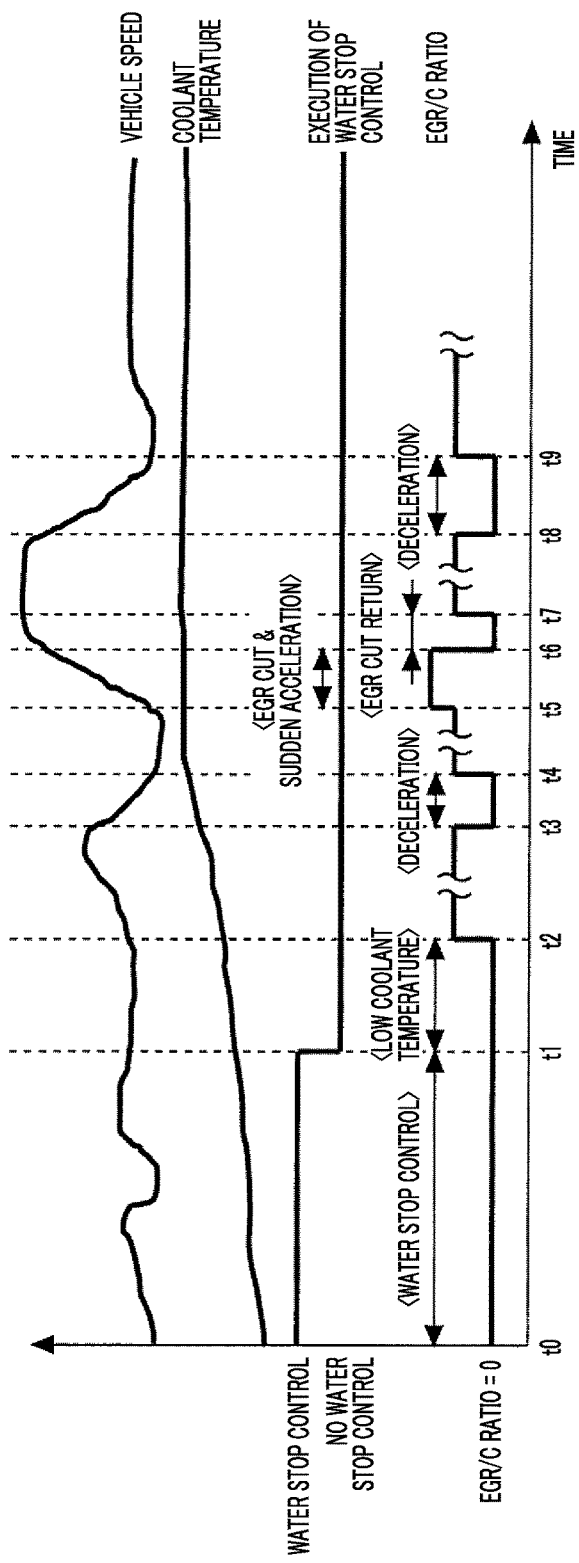
FIG. 2 is a timing chart showing temporal changes in various state quantities during the operation of an internal combustion engine.

FIG. 2 is a timing chart showing temporal changes in various state quantities during the operation of the internal combustion engine 10. In the timing chart shown in FIG. 2, the first chart shows a temporal change in vehicle speed, the second chart shows a temporal change in coolant temperature, the third chart shows a temporal change in the execution of water stop control, and the fourth chart shows a temporal change in EGR/C ratio.

(a) Control During Period in which Water Stop Control is Performed

A period from time t0 to t1 in FIG. 2 corresponds to the "period in which water stop control is performed" described in (a). Immediately after the start of the water stop control, the temperature of the coolant in the EGR cooler 24 is low. Therefore, when the EGR gas flows into the EGR cooler 24 during a period in which the coolant temperature is lower than the dew point of the exhaust gas, condensed water is generated in the EGR cooler 24. As described above, the flow of the coolant into the EGR cooler 24 is also stopped during the water stop control period. For this reason, when the EGR gas continues to flow into the EGR cooler 24 during the water stop control period, the coolant may boil within the EGR cooler 24. The flow of the EGR gas into the EGR cooler 24 can be caused by pulsation of the exhaust gas when the flow rate ratio adjusting valve 28 is controlled so that the EGR/C ratio becomes a value greater than zero, even during the EGR cut in which the EGR control valve is fully closed.

Therefore, in the system of the present embodiment, during the period in which the water stop control is performed, the flow rate ratio adjusting valve 28 is controlled so that the EGR/C ratio becomes zero. Determination regarding whether or not the water stop control is being performed can be made by determining whether or not the coolant temperature detected by the temperature sensor 34 is lower than the predetermined first temperature and the flow rate detected by the flow rate sensor 36 is equal to or less than a predetermined flow rate. The predetermined flow rate is a maximum flow rate realized during the water stop control, that is, a flow rate at the time of intermittent driving of the water pump during the water stop control. As the predetermined flow rate, a value set in advance can be used. According to such control, generation of condensed water in the EGR cooler 24 during the period in which the water stop control is performed can be suppressed, and boiling of the coolant in the EGR cooler 24 can be suppressed.

(b) Control During Period in which Fuel Cut is Performed

A period from time t3 to t4 and a period from time t8 to t9 in FIG. 2 correspond to the "period in which fuel cut is performed" described in (b). At the time of deceleration of the vehicle, fuel cut may be performed to stop fuel injection and improve fuel efficiency. During the period in which the fuel cut is performed, since the combustion in the internal combustion engine 10 is not performed, a low-temperature gas is exhausted to the exhaust passage 14. Therefore, when the EGR gas flows into the EGR cooler 24 during the fuel cut period, the temperature of the EGR cooler 24 may drop below the dew point of the exhaust gas. In this case, when fuel injection is resumed and the exhaust gas flows into the low-temperature EGR cooler 24, condensed water may be generated in the EGR cooler 24.

Therefore, in the system of the present embodiment, during the period in which the fuel cut is performed, the flow rate ratio adjusting valve 28 is controlled so that the EGR/C ratio becomes zero. According to such control, since a temperature drop in the EGR cooler 24 during the period in which the fuel cut is performed can be suppressed, generation of condensed water at the time of inflow of the EGR gas after resumption of fuel injection can be suppressed.

In a case where the bed temperature of the catalyst 19 reaches an allowed upper limit temperature (hereinafter, referred to as "overheat temperature"), it is needed to give priority to lowering the bed temperature of the catalyst 19 from the viewpoint of protection of the catalyst 19. Therefore, in the system of the present embodiment, during the period in which the fuel cut is performed, the flow rate ratio adjusting valve 28 may be controlled so that the EGR/C ratio becomes one in a case where determination that the bed temperature of the catalyst 19 detected by the temperature sensor 32 has reached the overheat temperature (hereinafter, referred to as catalyst OT determination) is made, and the flow rate ratio adjusting valve 28 may be controlled so that the EGR/C ratio becomes zero in a case where the catalyst OT determination is not made. As a result, since the exhaust gas temperature when the catalyst OT determination is made can be lowered, the catalyst 19 can be protected from overheating and deterioration in purification performance can be suppressed.

The catalyst OT determination is not limited to the method using the bed temperature of the catalyst 19 detected by the temperature sensor 32. That is, the bed temperature of the catalyst 19 may be estimated from the operating state of the internal combustion engine 10 using a known method. Alternatively, the catalyst OT determination may be performed by another known method using the operating state of the internal combustion engine 10.

(c) Control During Period Immediately After Returning from EGR Cut

A period from time t5 to t6 in FIG. 2 corresponds to the period in which the EGR cut is performed. Therefore, a period from time t6 to t7 corresponds to the "period immediately after returning from EGR cut" described in (c). During the period in which the EGR cut is performed, since the EGR control valve 22 is fully closed, the temperatures of components forming the EGR passage, such as the EGR passage 20, the EGR control valve 22, and the EGR cooler 24, gradually drop. Therefore, when the high-temperature EGR gas flows into the EGR cooler 24 at the time of returning from the EGR cut, the temperature of the EGR gas gradually drops during the flow of the EGR gas from the EGR cooler 24 to the EGR control valve 22 through the EGR passage 20. In this case, the temperature of the EGR gas may drop below the dew point of the exhaust gas and condensed water may be generated.

Therefore, in the system of the present embodiment, during a predetermined period from time t6 at which returning from the EGR cut occurs, the flow rate ratio adjusting valve 28 is controlled so that the EGR/C ratio becomes zero. The longer the period in which the EGR cut is performed, the lower the temperatures of the components forming the EGR passage. For this reason, it is preferable that the predetermined period herein is set in advance by a map or the like so that the longer the period in which the last EGR cut is performed, the longer the predetermined period. According to such control, since the EGR gas immediately after returning from the EGR cut bypasses the EGR cooler 24, a situation in which the temperature of the EGR gas greatly drops to a temperature equal to or lower than the dew point of the exhaust gas can be suppressed.

When the EGR gas flows to the bypass passage 26 side at time t6 of returning from the EGR cut, the temperatures of the EGR passage 20 and the EGR control valve 22 rise due to the heat of the EGR gas. Therefore, even if the EGR gas flows to the EGR cooler 24 side at the subsequent time t7, a situation in which the temperature of the EGR gas drops to a temperature equal to or lower than the dew point during the flow of the EGR gas can be suppressed. In a case where the temperature of the coolant flowing into the EGR cooler 24 is extremely low, a situation is also assumed in which the temperature of EGR gas becomes equal to or lower than the dew point in a case where the EGR gas flows to the EGR cooler 24 side thereafter. Therefore, in the system of the present embodiment, after the EGR/C ratio is set to zero immediately after returning from the EGR cut, for example, during a period in which the temperature of the coolant is lower than the predetermined second temperature (for example, 80° C.), the flow rate ratio adjusting valve 28 is controlled so that the EGR/C ratio is maintained at zero. In a case where the temperature of the coolant becomes equal to or higher than the second temperature, the flow rate ratio adjusting valve 28 is controlled so that the EGR/C ratio becomes a value greater than zero. According to such control, generation of condensed water after returning from the EGR cut can be suppressed.

Specific Processing of First Embodiment

Figure 3:
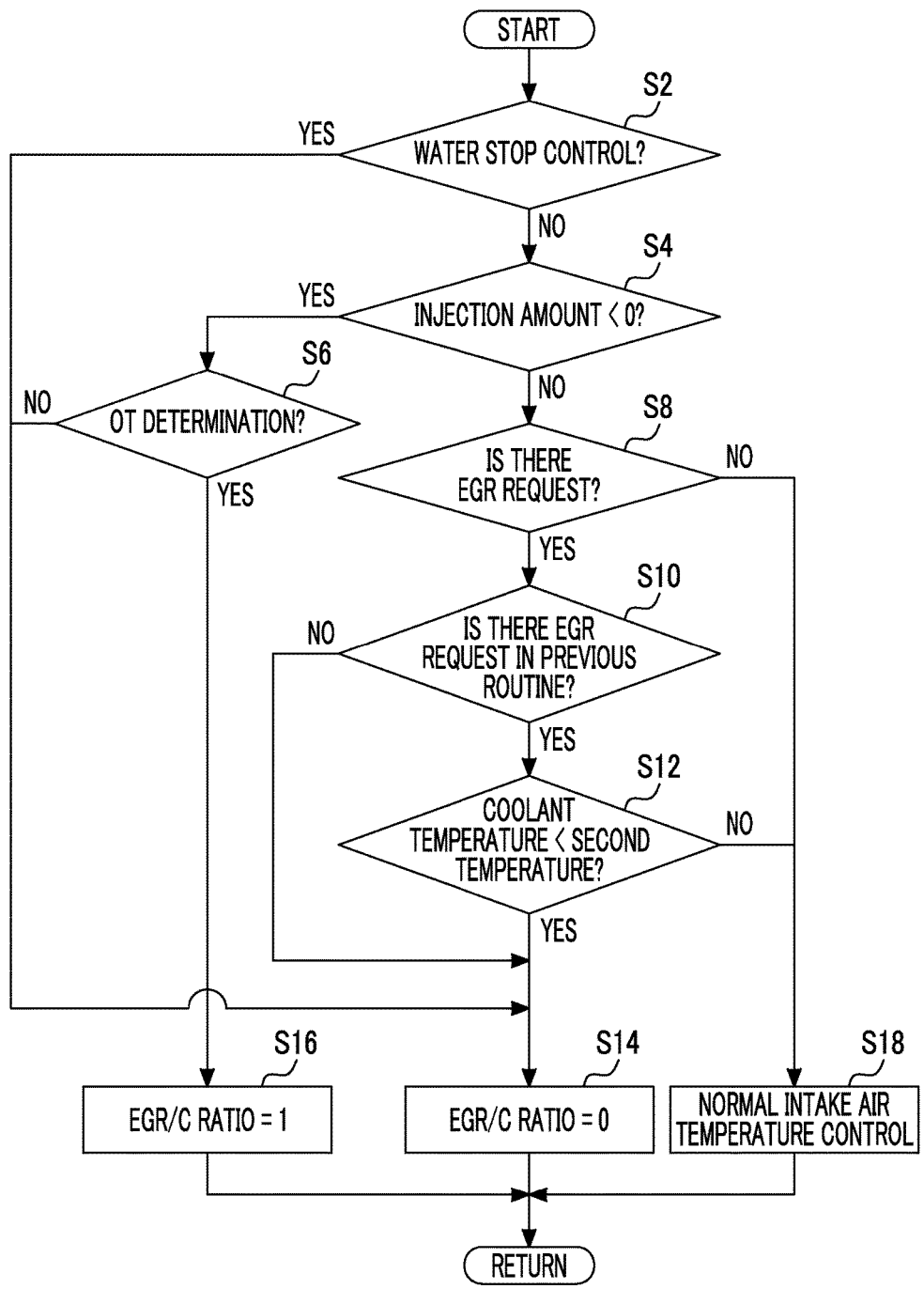
FIG. 3 is a flowchart of a routine executed by a system of a first embodiment.

Next, specific processing of the intake air temperature control performed in the first embodiment will be described with reference to the flowchart. FIG. 3 is a flowchart of a routine executed by the system of the first embodiment. The routine shown in FIG. 3 is repeatedly executed at a predetermined control cycle by the ECU 30.

In the routine shown in FIG. 3, first, the ECU 30 determines whether or not the water stop control is in progress (step S2). As a result, in a case where the ECU 30 determines that the water stop control is in progress, the process proceeds to step S14 to set the EGR/C ratio to zero. On the other hand, in a case where the ECU 30 determines that the water stop control is not in progress, the process proceeds to the next step to determine whether or not the fuel cut is in progress by determining whether or not injection amount<0 is satisfied (step S4). As a result, in a case where the ECU 30 determines that injection amount<0 is satisfied, the ECU 30 determines that the fuel cut is in progress, and then determines whether or not the OT determination is satisfied (step S6). As a result, in a case where the ECU 30 determines that the OT determination is not satisfied, the process proceeds to step S14 to set the EGR/C ratio to zero. On the other hand, in a case where the OT determination is satisfied, the EGR/C ratio is set to one in order to lower the temperature of the exhaust gas.

In a case where the ECU 30 determines that injection amount<0 is not satisfied in step S4, the ECU 30 determines that the fuel cut is not in progress, and proceeds to the next step. In the next step, the ECU 30 determines whether or not there is an EGR request (step S8). As a result, in a case where the ECU 30 determines that there is no EGR request, that is, in a case where the ECU 30 determines the EGR cut in which the target EGR ratio is 0%, the process proceeds to step S18 to perform normal intake air temperature control using the flow rate ratio adjusting valve 28.

On the other hand, in a case where the ECU 30 determines that there is an EGR request in step S8, that is, in a case where the target EGR ratio is a value greater than 0%, the process proceeds to the next step to determine whether or not there is an EGR request in the previous routine (step S10). As a result, in a case where the ECU 30 determines that there is no EGR request in the previous routine, the time for returning from the EGR cut is determined. In this case, the process proceeds to step S14 to set the EGR/C ratio to zero.

On the other hand, in a case where the ECU 30 determines that there is an EGR request in the previous routine in step S10, a period after returning from the EGR cut is determined. In this case, the process proceeds to the next step to determine whether or not the temperature of the coolant is lower than the predetermined second temperature (step S12). The second temperature is a threshold value of the coolant temperature at which no condensed water is generated in the EGR cooler 24 or the EGR passage 20. As the second temperature, a value set in advance is read. As a result, in a case where the ECU 30 determines that coolant temperature <second temperature is not satisfied, the ECU 30 determines that there is no possibility that condensed water will be generated, and proceeds to step S18 to perform normal intake air temperature control using the flow rate ratio adjusting valve 28. On the other hand, in a case where the ECU 30 determines that coolant temperature<second temperature is satisfied, the ECU 30 determines that condensed water may still be generated, and proceeds to step S14 to set the EGR/C ratio to zero.

As described above, according to the system of the first embodiment, in a wide operating state, it is possible to suppress the generation of condensed water in the EGR cooler 24 and the EGR passage 20.

Figure 4:
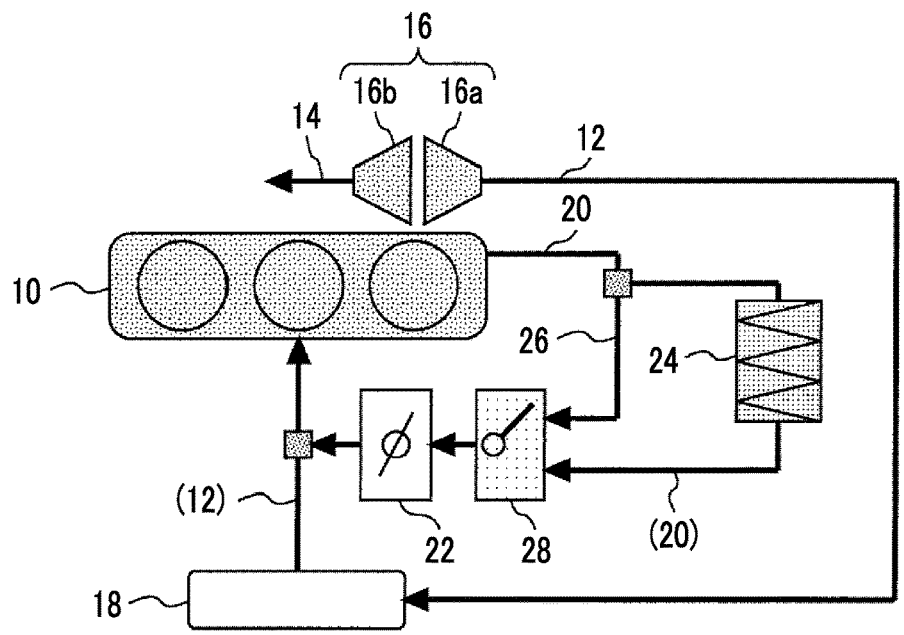
FIG. 4 is a diagram showing a modification example of the configuration of an engine system to which a control device of the embodiment is applied.
Figure 5:
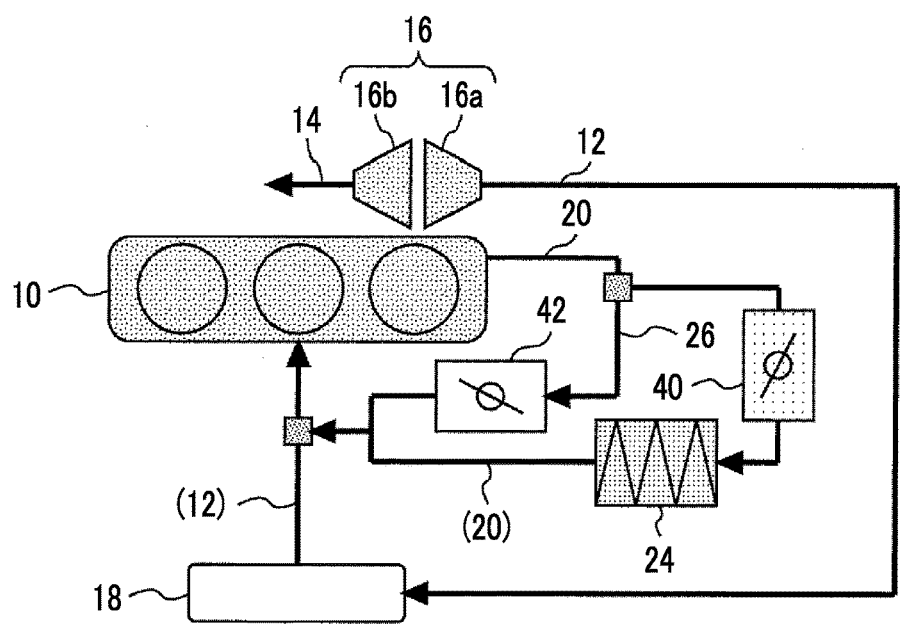
FIG. 5 is a diagram showing a modification example of the configuration of an engine system to which a control device of the embodiment is applied.
Figure 6:
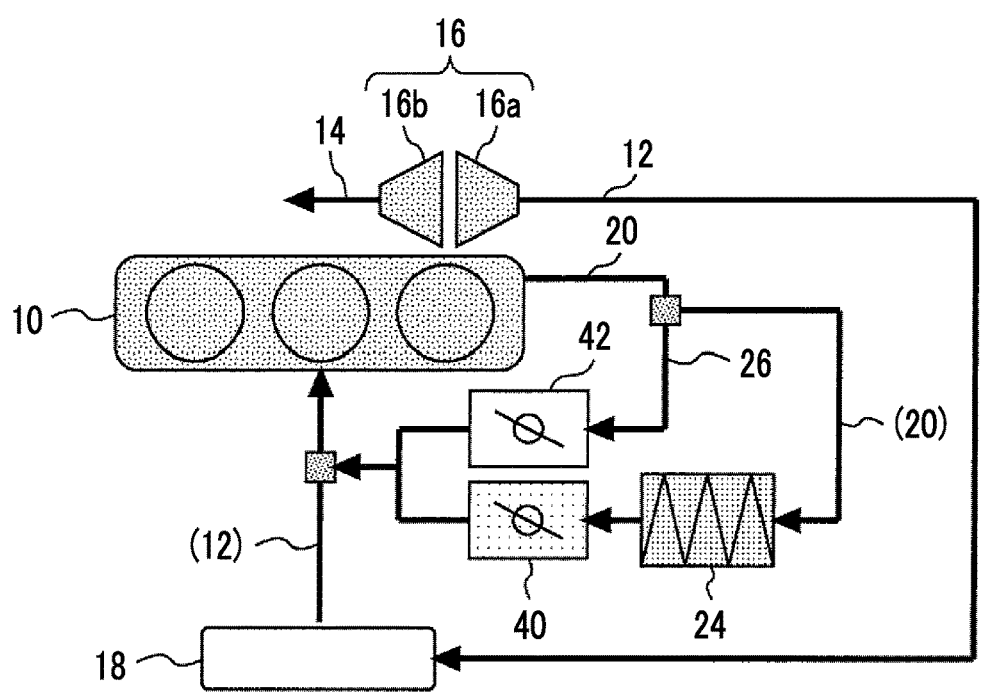
FIG. 6 is a diagram showing a modification example of the configuration of an engine system to which a control device of the embodiment is applied.

In the system of the first embodiment described above, the system including the EGR control valve 22 and the flow rate ratio adjusting valve 28 has been described. However, the arrangement and configuration of the valves are not limited to those shown in FIG. 1. FIGS. 4 to 6 are diagrams showing modification examples of the configuration of the engine system to which the control device according to the embodiment is applied. The configuration of the system shown in FIG. 4 is the same as the configuration of the system shown in FIG. 1 except that the flow rate ratio adjusting valve 28 is provided at the junction of the EGR passage 20. In the system shown in FIG. 4 configured in this manner, the same control as in the system shown in FIG. 1 can be performed by operating the EGR control valve 22 and the flow rate ratio adjusting valve 28.

In addition, the configuration of the system shown in FIG. 5 is the same as the configuration of the system shown in FIG. 1 except that a first flow rate adjusting valve 40 and a second flow rate adjusting valve 42 are provided instead of the EGR control valve 22 and the flow rate ratio adjusting valve 28. The first flow rate adjusting valve 40 is disposed at a position between the branch portion and the EGR cooler 24 in the EGR passage 20. The first flow rate adjusting valve 40 can adjust the flow rate of the EGR gas passing through the EGR cooler 24. The second flow rate adjusting valve 42 is disposed in the middle of the bypass passage 26. The second flow rate adjusting valve 42 can adjust the flow rate of the EGR gas passing through the bypass passage 26. The configuration of the system shown in FIG. 6 is the same as the configuration of the system shown in FIG. 1 except that the first flow rate adjusting valve 40 is disposed between the EGR cooler 24 and the junction portion in the EGR passage 20. In the system shown in FIG. 5 or 6 configured in this manner, EGR control can be performed while setting the EGR/C ratio to zero by operating the first flow rate adjusting valve 40 to be fully closed in order to adjust the opening degree of the second flow rate adjusting valve 42. In addition, EGR control can be performed while setting the EGR/C ratio to one by operating the second flow rate adjusting valve 42 to be fully closed in order to adjust the opening degree of the first flow rate adjusting valve 40.

In the system of the first embodiment described above, the temperature sensors 32, 34, the flow rate sensor 36, and the like are used in order to acquire various state quantities of the internal combustion engine 10, but the state quantities may be estimated from the operating state using a known method.

In the system of the first embodiment described above, a system including a refrigerant circuit for introducing coolant discharged from a water jacket provided inside the main body of the internal combustion engine 10, as a refrigerant, into the EGR cooler 24 has been described. However, the configuration of the refrigerant circuit applicable to the system of the first embodiment is not limited thereto. That is, the refrigerant circuit for introducing the refrigerant into the EGR cooler 24 may be configured as a refrigerant circuit of a separate system from the coolant of the internal combustion engine 10. In this case, determination regarding whether or not the water stop control is being performed can be made by detecting the temperature and the flow rate of the refrigerant introduced into the EGR cooler 24 using a sensor or the like and determining whether or not the detected coolant temperature is lower than a predetermined warming-up completion temperature and the detected flow rate is equal to or less than a predetermined flow rate.

The ECU 30 included in the system of the first embodiment may be configured as follows. Each function of the ECU 30 may be realized by a processing circuit. The processing circuit of the ECU 30 may include at least one processor and at least one memory. In a case where the processing circuit includes at least one processor and at least one memory, each function of the ECU 30 may be realized by software, firmware, or a combination of software and firmware. At least one of the software and the firmware may be described as a program. At least one of the software and the firmware may be stored in at least one memory. At least one processor may realize each function of the control device by reading and executing a program stored in at least one memory. At least one memory may include a non-volatile or volatile semiconductor memory.

The processing circuit of the ECU 30 may include at least one dedicated hardware. In a case where the processing circuit includes at least one dedicated hardware, the processing circuit may be, for example, a single circuit, a composite circuit, a programmed processor, a parallel programmed processor, an application specific integrated circuit (ASIC), a field-programmable gate array (FPGA), or a combination of these elements. The functions of the respective sections of the ECU 30 may be realized by processing circuits. Alternatively, the functions of the respective sections of the ECU 30 may be realized as a whole by a processing circuit. Some of the functions of the ECU 30 may be realized by dedicated hardware, and the other functions may be realized by software or firmware. The processing circuit may realize each function of the ECU 30 by hardware, software, firmware, or a combination of these elements.

What is claimed is:

1. A control device for an internal combustion engine, the control device comprising:
    an exhaust gas recirculation passage that connects an exhaust passage and an intake passage of an internal combustion engine to each other;
    an exhaust gas recirculation cooler disposed in the exhaust gas recirculation passage, the exhaust gas recirculation cooler being configured to perform heat exchange between refrigerant and exhaust gas which flow through the exhaust gas recirculation cooler;
    a bypass passage which is divided form from the exhaust gas recirculation passage, the bypass passage being configured to bypass the exhaust gas recirculation cooler;
    a flow rate ratio adjusting mechanism configured to adjust a flow rate ratio between an amount of exhaust gas flowing to the exhaust gas recirculation cooler and an amount of exhaust gas flowing to the bypass passage;
    an exhaust gas recirculation control mechanism configured to control execution and stopping of an exhaust gas recirculation operation for recirculating exhaust gas into a cylinder of the internal combustion engine through the exhaust gas recirculation passage; and
    an electronic control unit configured to control the exhaust gas recirculation control mechanism and the flow rate ratio adjusting mechanism based on an operating state of the internal combustion engine,
    wherein the electronic control unit is configured to adjust the flow rate ratio such that the amount of exhaust gas flowing to the exhaust gas recirculation cooler becomes zero during (i) a predetermined period from a point in time at which the exhaust gas recirculation operation shifts from stop to execution, (ii) a period in which fuel cut, in which fuel injection is stopped, is performed and a bed temperature of a catalyst disposed in the exhaust passage is lower than a predetermined overheat temperature, or (iii) a period in which a flow rate of refrigerant flowing to the exhaust gas recirculation cooler is lower than a predetermined flow rate and a temperature of the refrigerant is lower than a predetermined first temperature.

2. The control device according to claim 1, wherein the electronic control unit is configured to adjust the flow rate ratio such that the amount of exhaust gas flowing to the bypass passage becomes zero when the bed temperature of the catalyst reaches the overheat temperature during a period in which the fuel cut is performed.

3. The control device according to claim 1, wherein the electronic control unit is configured to adjust the flow rate ratio such that the amount of exhaust gas flowing to the exhaust gas recirculation cooler becomes zero during a period in which the temperature of the refrigerant is lower than a predetermined second temperature after the exhaust gas recirculation operation shifts from stop to execution.

4. The control device according to claim 1, wherein:
the flow rate ratio adjusting mechanism is a flow rate ratio adjusting valve that is provided at an upstream side connecting portion at which the exhaust gas recirculation passage and the bypass passage are connected, and the upstream side connecting portion is closer to the exhaust passage than the exhaust gas recirculation cooler in the exhaust gas recirculation passage; and
the exhaust gas recirculation control mechanism is an exhaust gas recirculation control valve that is provided to be closer to the intake passage than the exhaust gas recirculation cooler in the exhaust gas recirculation passage, the exhaust gas recirculation control valve is closer to the intake passage than a downstream side connecting portion at which the exhaust gas recirculation passage and the bypass passage are connected, and the downstream side connecting portion is closer to the intake passage than the exhaust gas recirculation passage.

5. The control device according to claim 1, wherein:
the flow rate ratio adjusting mechanism is a flow rate ratio adjusting valve that is provided at a downstream side connecting portion at which the exhaust gas recirculation passage and the bypass passage are connected, and the downstream side connecting portion is closer to the intake passage than the exhaust gas recirculation cooler in the exhaust gas recirculation passage; and
the exhaust gas recirculation control mechanism is an exhaust gas recirculation control valve that is provided so as to be closer to the intake passage than the flow rate ratio adjusting valve in the exhaust gas recirculation passage.

6. The control device according to claim 1, wherein:
the flow rate ratio adjusting mechanism includes a first flow rate adjusting valve and a second flow rate adjusting valve, the first flow rate adjusting valve is provided so as to be closer to the exhaust passage than the exhaust gas recirculation cooler in the exhaust gas recirculation passage, the first flow rate adjusting valve is closer to the intake passage than an upstream side connecting portion, at which the exhaust gas recirculation passage and the bypass passage are connected, and which is closer to the exhaust passage than the exhaust gas recirculation cooler, and the second flow rate adjusting valve is provided in the bypass passage; and
the exhaust gas recirculation control mechanism includes the first flow rate adjusting valve and the second flow rate adjusting valve.

7. The control device according to claim 1, wherein:
the flow rate ratio adjusting mechanism is configured to include a first flow rate adjusting valve and a second flow rate adjusting valve, the first flow rate adjusting valve is provided in the exhaust gas recirculation passage and the first flow rate adjusting valve is closer to the intake passage than a downstream side connecting portion, at which the exhaust gas recirculation passage and the bypass passage, and which is closer to the intake passage than the exhaust gas recirculation cooler, and the second flow rate adjusting valve is provided in the bypass passage; and
the exhaust gas recirculation control mechanism is configured to include the first flow rate adjusting valve and the second flow rate adjusting valve.

* * * * *